(12) United States Patent
Kaaja et al.

(10) Patent No.: US 8,803,661 B2
(45) Date of Patent: Aug. 12, 2014

(54) METHOD AND APPARATUS FOR CONTENTION RESOLUTION OF PASSIVE ENDPOINTS

(75) Inventors: Jari-Jukka Harald Kaaja, Järvenpää (FI); Sergey Boldyrev, Söderkulla (FI); Jarmo Tapani Arponen, Espoo (FI); Joni Jorma Marius Jantunen, Helsinki (FI)

(73) Assignee: Nokia Corporation, Espoo (FI)

( * ) Notice: Subject to any disclaimer, the term of this patent is extended or adjusted under 35 U.S.C. 154(b) by 849 days.

(21) Appl. No.: 12/789,049

(22) Filed: May 27, 2010

(65) Prior Publication Data

US 2011/0263297 A1 Oct. 27, 2011

Related U.S. Application Data

(60) Provisional application No. 61/328,527, filed on Apr. 27, 2010.

(51) Int. Cl.
*H04Q 5/22* (2006.01)
*H04W 52/00* (2009.01)

(52) U.S. Cl.
USPC ....... 340/10.1; 340/10.2; 340/572.1; 370/312

(58) Field of Classification Search
None
See application file for complete search history.

(56) References Cited

U.S. PATENT DOCUMENTS

| | | | |
|---|---|---|---|
| 2006/0114104 A1 | 6/2006 | Scaramozzino | |
| 2006/0280181 A1* | 12/2006 | Brailas et al. | 370/392 |
| 2007/0139163 A1* | 6/2007 | Powell et al. | 340/10.2 |
| 2007/0257775 A1* | 11/2007 | Nishijima | 340/10.1 |
| 2008/0143484 A1* | 6/2008 | Twitchell | 340/10.1 |
| 2009/0196304 A1 | 8/2009 | Sayenko | |
| 2010/0148931 A1* | 6/2010 | Pappu et al. | 340/10.2 |

FOREIGN PATENT DOCUMENTS

| | | |
|---|---|---|
| EP | 1 804 191 A1 | 7/2007 |
| EP | 09164761.0 | 7/2009 |
| WO | WO 2007/060493 A2 | 5/2007 |
| WO | WO 2009/025425 A1 | 2/2009 |
| WO | WO 2009/038309 A2 | 3/2009 |
| WO | WO 2009/054568 A1 | 4/2009 |

OTHER PUBLICATIONS

A Study on Control Method to ReduceCollisions and Interferences between Multiple RFID Readers and RFID Tag, abstract only, Kim et al., in New Trends in Information and Service Science, 2009, Issue Date: Jun. 30, 2009-Jul. 2, 2009, pp. 1-1.

(Continued)

*Primary Examiner* — Benjamin C Lee
*Assistant Examiner* — Rajsheed Black-Childress
(74) *Attorney, Agent, or Firm* — Ditthavong & Steiner, P.C.

(57) ABSTRACT

An approach is provided for contention resolution of passive endpoints. A contention resolution platform causes, at least in part, scanning of a data channel of a passive endpoint at a first active endpoint to detect a powered state of the passive endpoint. The contention resolution platform then identifies a second active endpoint based, at least in part, on detection of the powered state. The contention resolution platform generates a request to the second active endpoint for the first active endpoint to enter an active mode with respect to the passive endpoint, causing, at least in part, transmission of the request to the second active endpoint. The contention resolution platform then joins the first active endpoint to one or more powered periods of the passive endpoint based, at least in part, on the response received.

20 Claims, 13 Drawing Sheets

(56) References Cited

OTHER PUBLICATIONS

RFID: A New Software Based Solution to Avoid Interference, abstract only, Rizvi et al., in Advances in Computer and Information Sciences and Engineering 2008, http://www.springerlink.com/content/h06rp70826220203/, pp. 1-2.

Survey, Nomenclature and Comparison of Reader Anti-Collision Protocols in RFID, Joshi, et al., http://tr.ietejournals.org/article.asp?issn=0256-4602;year=2008;volume=25;issue=5;spage=285;epage=292;aulast=Joshi, 2008, pp. 1-8.

U.S. Appl. No. 12/552,094, filed Sep. 1, 2009, Sergey Boldyrev.

U.S. Appl. No. 12/621,844, filed Nov. 19, 2009, Sergey Boldyrev.

U.S. Appl. No. 12/696,873, filed Jan. 29, 2010, Sergey Boldyrev.

Adaptive splitting protocols for RFID tag collision arbitration, Myung et al., International Symposium on Mobile Ad Hoc Networking & Computing, Proceedings of the 7th ACM international symposium on Mobile ad hoc networking and computing, SESSION: Medium access control, 2006, pp. 202-213.

Adversarial Contention Resolution for Simple Channels, Bender et al., ACM Symposium on Parallel Algorithms and Architectures, Proc. of the 17th annual ACM symposium on Parallelism in algorithms and architectures, SESSION: Radio networks, 2005, pp. 325-332.

The Reader Collision Problem in RFID Systems, Leong et al., Proceedings of IEEE 2005 International Symposium on Microwave, Antenna, Propagation and EMC Technologies for Wireless Communications (MAPE 2005), pp. 1-8.

Hwang et al., "Distributed Tag Access with Collision-Avoidance among Mobile RFID Readers", International Conference on Computational Science and Engineering, Aug. 29, 2009, pp. 1-6.

International Search Report for corresponding PCT Application No. PCT/FI2011/050325, Aug. 19, 2011, pp. 1-6.

Written Opinion for corresponding PCT Application No. PCT/FI2011/050325, Aug. 19, 2011, pp. 1-7.

\* cited by examiner

300

340

METHOD AND APPARATUS FOR CONTENTION RESOLUTION OF PASSIVE ENDPOINTS

RELATED APPLICATIONS

This application claims the benefit of the earlier filing date under 35 U.S.C. §119(e) of U.S. Provisional Application Ser. No. 61/328,527 filed Apr. 27, 2010, entitled "Method and Apparatus for Contention Resolution of Passive Endpoints," the entirety of which is incorporated herein by reference.

BACKGROUND

Service providers (e.g., wireless, cellular, etc.) and device manufacturers are continually challenged to deliver value and convenience to consumers by, for example, providing compelling network services. One area of interest has been the development of low-cost radio frequency (RF) memory tags (e.g., high memory capacity near field communication (NFC) tags or other wireless memory tags) to facilitate delivery of services and access or transfer of related digital content (e.g., media files, documents, applications, etc.). In particular, it is noted that the use of passive RF memory tags are becoming more common. By way of example, these low-cost RF memory tags generally include no internal power source and are activated when a corresponding reader powers the tag using a low-power radio wave field. When using such technologies, mobile devices, with reading/writing capabilities, typically scan their local surroundings to discover and access, service endpoints including passive RF memory tags of the service infrastructure. However, in some cases two or more active endpoints (e.g. the mobile devices with reading capability) may attempt to access and activate the same passive endpoint simultaneously, thereby potentially causing contention or interference among the radio fields powering and/or reading the passive endpoint. Moreover, if the service endpoint contains multiple passive RF memory tags, contention among responses from the multiple RF memory tags may also be problematic. As a result, service providers and device manufacturers face significant technical challenges to resolve potential contention when accessing information from passive endpoints.

SOME EXAMPLE EMBODIMENTS

Therefore, there is a need for an approach for contention resolution of passive endpoints.

According to one embodiment, a method comprises causing, at least in part, scanning of a data channel of a memory tag at a first active endpoint to detect a powered state of the memory tag. The method also comprises identifying a second active endpoint based, at least in part, on detection of the powered state. The method also comprises generating a request to the second active endpoint for the first active endpoint to enter an active mode with respect to the memory tag. The method further comprises causing, at least in part, transmission of the request to the second active endpoint. The method also comprises receiving a response to the request. The method further comprises joining the first active endpoint to one or more powered periods of the memory tag based, at least in part, on the response.

According to another embodiment, an apparatus comprising at least one processor, and at least one memory including computer program code, the at least one memory and the computer program code configured to, with the at least one processor, cause, at least in part, the apparatus to cause, at least in part, scanning of a data channel of a memory tag at a first active endpoint to detect a powered state of the memory tag. The apparatus is also caused to identify a second active endpoint based, at least in part, on detection of the powered state. The apparatus is also caused to generate a request to the second active endpoint for the first active endpoint to enter an active mode with respect to the memory tag. The apparatus is further caused to cause, at least in part, transmission of the request to the second active endpoint. The apparatus is also caused to receive a response to the request. The apparatus is also caused to join the first active endpoint to one or more powered periods of the memory tag based, at least in part, on the response.

According to another embodiment, a computer-readable storage medium carrying one or more sequences of one or more instructions which, when executed by one or more processors, cause, at least in part, an apparatus to cause, at least in part, scanning of a data channel of a memory tag at a first active endpoint to detect a powered state of the memory tag. The apparatus is also caused to identify a second active endpoint based, at least in part, on detection of the powered state. The apparatus is also caused to generate a request to the second active endpoint for the first active endpoint to enter an active mode with respect to the memory tag. The apparatus is further caused to cause, at least in part, transmission of the request to the second active endpoint. The apparatus is also caused to receive a response to the request. The apparatus is also caused to join the first active endpoint to one or more powered periods of the memory tag based, at least in part, on the response.

According to another embodiment, an apparatus comprises means for causing, at least in part, scanning of a data channel of a memory tag at a first active endpoint to detect a powered state of the memory tag. The apparatus also comprises means for identifying a second active endpoint based, at least in part, on detection of the powered state. The apparatus also comprises means for generating a request to the second active endpoint for the first active endpoint to enter an active mode with respect to the memory tag. The apparatus also comprises means for causing, at least in part, transmission of the request to the second active endpoint. The apparatus also comprises means for receiving a response to the request. The apparatus also comprises means for joining the first active endpoint to one or more powered periods of the memory tag based, at least in part, on the response.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for contention resolution of passive endpoints are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
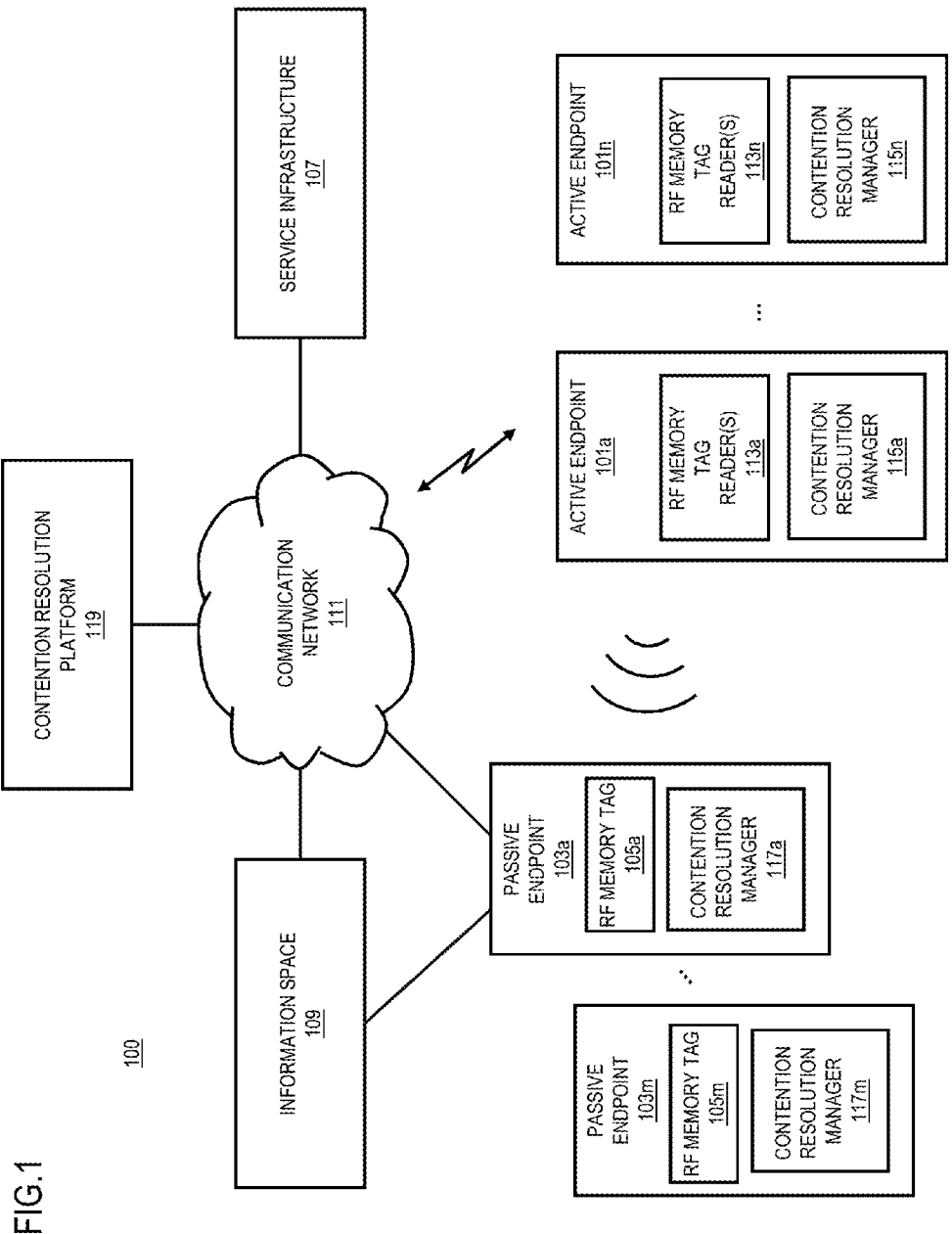
FIG. 1 is a diagram of a system capable of contention resolution of passive endpoints, according to one embodiment.

FIG. 1 is a diagram of a system capable of providing contention resolution of passive endpoints, according to one embodiment. As previously noted, many service providers enable their customers to access and/or retrieve related applications, services, content, and the like from one or more passive endpoints that are usually located in close proximity to the customer devices (e.g., a service kiosk from which information, data, applications, etc. can be directly transferred to customer devices). Passive endpoints employ, for instance, one or more passive RF memory tags that usually receive power for transmitting data from another device (e.g., an active endpoint that includes the capability to transmit power to the passive memory tag or service endpoint). In other words, as used herein, a passive endpoint is powered by another device (an active endpoint), where the active endpoint contains or has access to its own power supply for performing radio transmissions and/or for powering other devices. In addition to providing power, the active endpoints may also be capable of exchanging data with passive endpoints, such as providing response to the passive endpoints' requests, reading content from the passive endpoints, etc.

However, contention or conflicts among multiple active endpoints and/or multiple passive endpoints may arise when these various service endpoints interact simultaneously or during overlapping periods. By way of example, several different types of contention may arise between active endpoints and passive endpoints of the service infrastructure during powering and or reading processes such as: (1) between multiple active endpoints and one passive endpoint; (2) between one active endpoint and multiple passive endpoints; (3) between multiple active endpoints and multiple passive endpoints; and the like. More specifically, a contention may arise when two or more active endpoints attempt to read one passive endpoint simultaneously or try to power the same passive endpoint from multiple power sources. In another example, two passive endpoints may try to respond to an active endpoint at the same time, which can potentially interfere with or disrupt the connections and data transmissions between the active and passive endpoints.

Generally, a transmission from the passive endpoint may occur as a unicast transmission (e.g., a transmission directed to one specific active endpoint) or as a multicast transmission (e.g., a transmission directed to more than one active endpoint). Contention may occur in either the unicast or multicast scenario. For example, for a highly heterogeneous service infrastructure that provides multicast transmissions, it is possible that multiple active endpoints will communicate with the same passive endpoint as part of multiple or different multicast groups. In this case, the connections and data transmission between the passive endpoint and each of the multicast groups may partly overlap and cause potential interference and disruption of service delivery.

To address these problems, a system 100 of FIG. 1 introduces the capability to provide contention resolution of passive endpoints by enabling at least partly overlapping transmissions between one or more active endpoints 101a-101n (also collectively referred to as active endpoints 101) and one or more passive endpoints 103a-103m (also collectively referred to as passive endpoints 103) so that a common transmission (e.g., power transmissions and/or data transmission) of the passive endpoints 103 can be used in a joint manner among the active endpoints 101. More specifically, the system 100 enables an active endpoint 101a to detect when another active endpoint 101n is already powering or reading from one or more RF memory tags 105a-105m (also collectively referred to as RF memory tags 105) of the passive endpoints 103 before trying to power the same RF memory tags 105. In this way, the active endpoint 101a can avoid contention or interference with any existing transmissions involving the RF memory tags 105 and/or the passive endpoints 103. It is noted that for simplicity, a references to the passive endpoints 103 used herein is also intended to refer to the RF memory tags 105. In one embodiment, based on the detection, the active endpoints 101 can join in the current transmission, negotiate a transmission schedule (e.g., powering schedule and/or data transmission schedule) to avoid any contention, and/or the like.

As shown in FIG. 1, the system 100 comprises active endpoints 101a-101n having connectivity to or capable of reading information, data, applications, services, content, etc. from one or more passive endpoints 103a-103m. In one embodiment, the passive endpoints 103 are associated with a service infrastructure 107 and/or an information space 109 via the communication network 111. By way of example, the service infrastructure 107 includes one or more services (e.g., music service, mapping service, video service, social network service, content broadcasting service, etc.) and related content (e.g., documents, media files, maps, etc.) available directly from the service infrastructure 107 or from other content providers (not shown) or content sources (not shown) available over the communication network 111. In this example, the service infrastructure 107 uses the passive endpoints 103 as at least one means for delivering applications, services, content, etc. to the active endpoints 101.

In yet another embodiment, the service infrastructure 107 may be represented through one or more information spaces 109. By way of example, an information space 109 is an extension of the "Giant Global Graph" of information in which one can apply semantics and reasoning at a local level to query, process, distribute, or otherwise manipulate the information in the information space 109. Each information space 109 can be considered as an aggregated information set from any number of different sources. This multi-sourcing offers considerable flexibility by enabling the same piece of information to come from different sources, thereby providing internal redundancy and consistency of information. Furthermore, in the information space 109, information requested by a user may be distributed over several information sets, and therefore in order to deduce an accurate answer to a request, the information from different sources are extracted and combined. Moreover, the information space 109 can sense the user context, select and aggregate the service set or package and provide seamless mechanisms for information sharing via, for instance, the passive endpoints 103.

In the approach described herein, within the scope of the service infrastructure 107 (e.g., Nokia's OVI Store), a particular service or a set of services and/or related content (e.g., a service package) can be distributed to the active endpoints 101a-101n via the passive endpoints 103. For example, the service package can be uploaded to or stored in one or more of the passive endpoints 103 (i.e., the RF memory tags 105 of the passive endpoints 103). The active endpoints 101 can then read the passive endpoints 103 to retrieve the service package. Typically, the passive endpoints are located at point-of-sale locations for easy access by multiple active endpoints 101. In other use cases, the passive endpoints 103 may be used by organizations (e.g., companies, work places, etc.) to quickly distribute information among a group of users. For example, attendees of a meeting may retrieve meeting materials from a common passive endpoint 103. It is also contemplated that the passive endpoints 103 may be used in whatever context in which information, data, services, applications, etc. are to be distributed or delivered, including local information, important physical presence information, or other local contents which may utilize high memory capacity advantage of the RF memory tags.

As discussed previously, the passive endpoint 103 includes one or more RF memory tags 105 for delivering service packages, content, etc. to the active endpoints 101. In one embodiment, the RF memory tag 105 is a transponder including a small microchip that is attached to an antenna. These transponders come, for instance, in a wide variety of sizes, shapes, and forms can be read through most materials with the exception of conductive materials like water and metal. Generally, there are two types of transponders or RF memory tags 105, passive memory tags and active memory tags. Passive memory tags are generally smaller, lighter, and less expensive than active memory tags and can be applied to objects in harsh environments. They are also maintenance free and can last for years. By way of example, passive memory tags are only activated when they are within a response range of a tag reader (e.g., one of the tag readers 113a-113n of the active endpoints 101). Active tags differ in that they incorporate their own power source to transmit rather than reflect radio frequency signals.

In one embodiment, each active endpoint 101 may respectively include one or more RF memory tag readers 113a-113n (commonly used as reader devices, also collectively referred to as memory tag readers 113). When one or more of the active endpoints 101 are brought near one or more of the passive endpoints 103, communication between at least one corresponding memory tag reader 113 and the RF memory tag 105 occurs wirelessly. In one embodiment, the memory tag reader 113 contains a transmitter, receiver, control unit, and an antenna (not shown). The memory tag reader 113 traditionally performs three primary functions: powering the RF memory tag 105, demodulating the signal from the RF memory tag 105, and decoding the demodulated signal. For example, the memory tag reader 115 emits a low-power radio wave field that is used to power the memory tag 115 (e.g., using a wireless power transfer (WPT) channel) and then reads the data transmissions (e.g., using a data channel such as an ultra-wideband (UWB) data channel) which may be also based on back-scattering of the initial signal (reflected data transmission).

It is noted that use of mobile devices has increased to the point where more and more content is downloaded from local passive endpoints 103 and consumed the corresponding active endpoints 101, prompting the development of high capacity memories with fast ultra low power connectivity for use in RF memory tags 105. Moreover, recent technological advances in the field of radio frequency memory tags in mobile active endpoints 101a-101n of the service infrastructure use short range connectivity over, for instance, ultra-high frequency (UHF) radio transmissions and other similar near field communication (NFC) technologies for powering the passive endpoints 103 and ultra-wide band (UWB) techniques for data transfer to and from the passive endpoints 103. In this way, any content can be transferred between the active endpoints 101 and the passive endpoints 103. To resolve contention between the transmissions associated with the data transfers, the active endpoints 101 include respective contention resolution managers 115a-115n (also collectively referred to as contention resolution managers 115), and the passive endpoints 101 include equivalent contention resolution managers 117a-117m (also collectively referred to as contention resolution managers 117) for performing contention resolution as described herein. In one embodiment, the active endpoints 101 have connectivity to a contention resolution platform 119 over the communication network 111 to perform all or part of the functions of the contention resolution managers 115 and/or 117.

In one embodiment, an active endpoint 101 may retrieve a service package (e.g., applications, services, content, etc.) provided via the service infrastructure 107 using a Listen Before Talk (LBT) approach whereby the active endpoint 101 attempts to scan and start communication with a passive endpoint 103 (for example, using UWB connectivity) without first powering the passive endpoint 103. In other words, the active endpoint 101 may start with "UWB scan and communicate", before attempting to use its WPT signal for powering the passive endpoint 103. In this way, the active endpoint 101 avoids interfering with other existing transmissions, such as transmissions for powering the passive endpoint 103 and transferring data from the passive endpoint 103. In one embodiment, this process path may be selected after the active endpoint 101 checks whether any other high (and clear) enough WPT signal (e.g., a powering transmission) is already available for the passive endpoint 103 from another active endpoint 101.

Alternative, a user of an active endpoint may manually decide when to use or not to use powering by visually looking at passive endpoints. Passive endpoints may be equipped with indicators such as color codes or lights to show whether the endpoint is powered or not. User can decide, based on the indicator, to allow (or not to allow) their active endpoints to power the passive endpoint.

In one embodiment, a service infrastructure 107 may involve partly overlapping transmissions from two or more active endpoints 101, which may utilize a common target (e.g., passive endpoint 103) transmission in a joint manner. In this case, the contention resolution manager 115, contention resolution manager 117, and/or contention resolution platform 119 analyzes current connections (e.g., previously initiated connections, connections that are to be started or programmed to be started at a certain time and to last for a certain time period) related to the passive endpoints 103 and current status of the active endpoints 101. In one embodiment, the contention resolution platform 119 determines from the current connection information what communication slots are available, what device is powering the passive endpoints 103, what is the service session level, etc. The contention resolution platform 119 then utilizes the results from the analysis for resolving contention by, for example, holding one transmission from two or more active endpoints 101 to or from a passive endpoint 103 until the current ongoing transmission is completed.

In another embodiment, if contention resolution platform has access to priority information for each endpoint and the second active endpoint has a higher priority than the first active endpoint, the current ongoing transmission may be paused for a needed or estimated time period until the higher priority transmission is completed. The paused transmission may be resumed following the completion of the transmission with higher priority. As part of the contention resolution process, the contention resolution platform 119 may communicate with the service endpoints 101 and 103 via the communication network 111 and/or through the contention resolution managers 115 and 117.

In another embodiment, the contention resolution platform 119 may use a setup procedure such that a service endpoint 101 may initially start the process from passive mode (i.e., initially attempting to detect and communicate with the passive endpoint 103 via a data channel e.g., UWB), before requesting an active mode from another found or detected active endpoint 101. If no other active endpoints 101 are found in the proximity, the contention resolution platform 119 can direct the service endpoint 101 start powering the passive endpoint 103. However, if other active endpoints 101 are found, the endpoint 101 may first send a request to the contention resolution platform 119 to join the already powered periods of the passive endpoint 103.

In another embodiment, to prevent a contention problem from happening, the contention resolution platform 119 may direct the active endpoint 101 to advertise its powering of a passive endpoint 103 before actually starting to power the passive endpoint (i.e., via a sniffer). In this way, other active endpoints 101 may receive notice of the intent to power the passive endpoint 103 to avoid contention when other active endpoints 101 attempt to power the same passive endpoint 103. Additionally, the advertisement may provide other active endpoints 101 with information such as structure of powering slots and powering slot reservations. The other active endpoints 101 may join the session to get more visibility or utilize the free slots advertised.

Furthermore, the contention resolution manager 113a-113n and/or the contention resolution platform 119 may alert the active endpoint 101 to move closer to the passive endpoint 103. For example the active endpoint 101 that powers a passive endpoint 103 may be alerted to move closer to maximize the powering field for the passive endpoint 103. Additionally, other active endpoints 101 that are utilizing the powering period of a passive endpoint 103 provided by an active endpoint 101 may be alerted to get closer to the powering master to receive the highest benefit of the offered powering.

In one embodiment, where there are more than one active endpoints 101 available for powering passive endpoints 103, the contention resolution platform 119 may for example, select the powering master based on the powering capabilities of available active endpoints 101, decide when a powering master shall stop powering, decide which active endpoints 101 should not be allowed to power certain passive endpoints 103, etc.

In another embodiment, two active endpoints 101a and 101n of the service infrastructure 107 may come close to a passive endpoint 103a of the service infrastructure 107, and both active endpoints 101a and 101n may start scanning for powering the passive endpoint 103a (or one active endpoint 101a may initiate its WPT signal "x" milliseconds earlier than the other active endpoint 101n). In this exemplary embodiment, if no overlapping exists between the access periods of the active endpoints 101a and 101n to the passive endpoint 103a, both active endpoints 101a and 101n may negotiate a powering and data transmission schedule with no overlapping periods. In this case, each of the two approaching active endpoints 101a and 101n searches for or detects other nearby active endpoints 101 of the service infrastructure that may enable the powering the passive endpoint 103a. As part of the search or detection, the active endpoints 101a and 101n may discover each other (as well as other active endpoints 101) and may negotiate non-overlapping powering schedules with respect to the requested passive endpoint 103a. In other words, the negotiated powering schedule may provide for a certain period during which the active endpoint 101a will power and read from the passive endpoint 103a and another non-overlapping period for the active endpoint 101n to power and read from the same passive endpoint 103a, thereby avoiding contention problems.

In another embodiment, a powering period may either be used with one powering active endpoint 101a or shared with the other active endpoint 101n. In this embodiment, the active endpoint 101n would join the powering session of the passive endpoint 103 provided by the active endpoint 101a. By way of example, the active endpoint 101n can request a number of transmission slots from the active endpoint 101a. After the active endpoint 101n joins, the transmission slots involving both endpoints 101a and 101n are reordered according to the scheduling scheme defined by the contention resolution manager 115. For example, in a fair share scheme powering mode, the active endpoint 101a sharing "x" milliseconds of its powering period will get the same amount of powering from the other active endpoint 101n when both are using the same target passive endpoint 103a for content download or upload.

In yet another embodiment, a second active endpoint 101b may request to power the passive endpoint 103a, after a first active endpoint 101a has stopped powering the passive endpoint 103a. The second active end point 101b may join the first active endpoint 101a's powering period or wait until the powering period by the first active endpoint 101a is ended.

In another embodiment, following the request by the second active endpoint 101b to join a first active endpoint 101a's powering period of a passive endpoint 103a, the first active endpoint 101a may extend its powering period based on the joining request, assuming that there is a visibility among the active endpoints 101a and 101b where for example they belong to the same session so that when one of them powers the passive endpoint 101a, other active endpoints of the session can see what other active endpoints are part of the powering period.

However, if overlapping between the access periods of the active endpoints 101a and 101n is anticipated, a powering schedule that includes handover from one active endpoint 101a to the other active endpoint 101n can be negotiated. For example, in an overlapping case the active endpoint 101a may complete its data transfer and powering before the active endpoint 101n that might be sharing a joint powering session is completed with its data transfer. Accordingly, the data transfer to the active endpoint 101n may be interrupted unless the powering responsibility is handed over from the active endpoint 101a to the active endpoint 101n. In this case, contention resolution may include advertising a powering schedule among the active endpoints 101a and 101n via the data channel (e.g., UWB) before powering is activated. The powering hand over process may be explicit, wherein the responsibility is handed to another active endpoint 101b after a transmission ends. Alternatively, powering responsibility may be proactively handed to a second active endpoint 101b even while the first active endpoint 101a is still communicating with the passive endpoint 103a. This process may be initiated by the contention resolution platform 119.

In one embodiment, the contention resolution process may include the following steps: the active endpoint 101a advertises its attempt to start powering and scanning passive endpoints 103 in its neighborhood, if the active endpoint 101n, in response to the advertised notice, synchronizes itself with the active endpoint 101a, the powering period initiator 101a may become a "powering master" and create a session for this connection with the purpose of content transfer. The responding active endpoint 101n may request to join the session, for example, to utilize the available power provided by the active endpoint 101a for its own transmissions.

In another embodiment, the passive endpoint 103a may utilize an execution in place (XIP) technology and use its RF memory tags 105 for execution of a particular service, a set of services, or a package of services and content. In this embodiment, one passive endpoint 103a may be accessed from more than one active endpoints 101a-101n. For example, the access may be an attempt by two potential powering active endpoints 101a and 101n, where only one active endpoint 101a may proceed with the powering process, or the passive endpoint 103a may need to visualize two domains (e.g., one for each of the active endpoints 101a and 101n) in order to provide access to both active endpoints 101a and 101n. If the passive endpoint 103a does not succeed in providing combined access to the two groups of active endpoints 101a and 101n, the data transmission may be terminated. It is noted that, traditionally, if two or more active endpoints 101a-101n are competing for one resource, the passive endpoint 103a for example, the data transmission is either interleaved or the whole transmission is rescheduled.

By way of example, the communication network 111 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The active endpoints 101a-101n are any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the active endpoints 101a-101n can support any type of interface to the user (such as "wearable" circuitry, etc.). Further, the active endpoints include or otherwise have access to the functions of a memory tag reader 113.

By way of example, the active endpoints 101, the passive endpoints 103, the service infrastructure 107, the information space 109, the contention resolution manager 115, the contention resolution manager 117, and the contention resolution platform 119 communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the contention resolution managers 115 and 117 and the contention resolution platform 119 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client"

and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
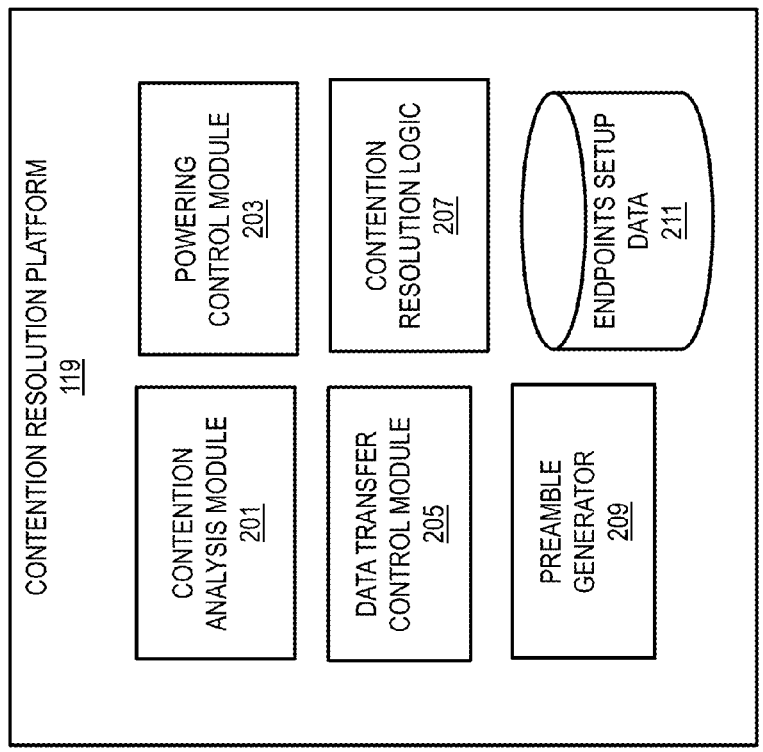
FIG. 2 is a diagram of the components of contention resolution platform, according to one embodiment.

FIG. 2 is a diagram of the components of contention resolution platform, according to one embodiment. By way of example, the contention resolution platform 119 includes one or more components for providing contention resolution of passive endpoints. It is contemplated that the functions of these components may be combined in one or more components or performed by other components of equivalent functionality such as the contention resolution managers 115 and 117. In this embodiment, the contention resolution platform 119 includes a contention analysis module 201, a powering control module 203, a data transfer control module 205, contention resolution logic 207 and a preamble generator 209.

As described above, in one example, two active endpoints 101a and 101n may approach and attempt to simultaneously access a passive endpoint 103. In this scenario, the contention analysis module 201 may interact with the other components of the contention resolution platform 119 to negotiate as a powering and data transmission schedule so that the two active endpoints 101a and 101m may access the passive endpoint 103 with no overlaps (and therefore no contention) occurring. This can be considered as an optimal case. In this case, the contention analysis module 201 of each of the respective active endpoints 101a and 101n may initiate detection of whether any other nearby active endpoints 101 may be already be powering the passive endpoint 103. As part of this detection, the powering control module 203 retrieves powering information (e.g., existing connections, available transmission slots, schedules, advertised notices of powering, etc.) related to the passive endpoint 103 from, for instance, the database 211 of endpoint setup data. If the passive endpoint is already powered, the powering control module 203 can retrieve information about the active endpoint 101 that is powering the passive endpoint 103. Otherwise, the powering control module 203 verifies whether any pending powering attempts exist for the specific passive endpoint 103. Based on the detection and/or retrieved information, the contention analysis module 201 may identify neighboring active endpoints 103 that are currently powering or intend to the power the passive endpoint 103. In this case, the contention analysis module 201 may refer to the contention resolution logic 207 to determine a contention resolution plan (e.g., negotiate a powering and transmission schedule) among the active endpoints 101a and 101. By way of example, depending on the transmission and data requirements of the active endpoints 101a and 101n may negotiate either overlapping or non-overlapping powering schedules. The content analysis module 201 can then report the specifics of the powering and transmission schedule to the powering control module 203 and related data transmission requirements to the data transfer control module 205.

In one embodiment, a powering period of the passive endpoint 103 may either be used with one powering active endpoint 101a, or shared with other active endpoints 101a-101n. In one embodiment, the active endpoints 101a-101n may operate according to a fair share manner powering mode. As described previously, when operating in a fair share mode, one active endpoint 101a that is sharing "x" milliseconds of its powering period with another active endpoint 101n will get the same amount of powering from the other active endpoint 101n, when both are using the same target passive endpoint 103 for content download or upload.

In another embodiment, the powering control module 203 may discover that the passive endpoint 103 is currently powered by another active endpoint 101n. In this case, the powering control module 203 may send a request to the current powering endpoint 101n to join the powered period of the passive endpoint 103. In certain embodiments, the request is received at the contention resolution manager 115, the contention resolution manager 117, and/or the contention resolution platform 119. If the request is approved or is otherwise successful, the powering control module 203 signals the contention resolution manager 115 of the requesting endpoint 101 to join the powering period.

In another embodiment, upon receiving the setup requirement information of the active endpoints 101a and 101n, the powering control module 203 may schedule two non-overlapping powering periods for the active endpoints 101a and 101n to power the passive endpoint 103 separately. Similarly, the data transfer control module 205 may schedule two non-overlapping data transmission period for the two active endpoints 101a and 101n for transmission of the data from the passive endpoint 103. In one embodiment, the active endpoints 101a and 101n upon receiving the information about each other may request certain powering and/or certain data transmission periods. In this case, the contention analysis module 201 checks the requested periods and allows the scheduling if the requested periods do not overlap. Otherwise, a warning may be sent to the active endpoints 101a and 101n to modify their requested periods.

In one embodiment as described previously, a first active endpoint 101a may advertise its attempt or intention to start powering and scanning one or more passive endpoints 103 in its neighborhood. If a second active endpoint 101n is in close proximity and receives the advertised notice, it may either respond to the notice or may otherwise account for the notice as part of its contention resolution process. In this case, the contention resolution platform 119 may, for instance, analyze the current status of the first and second active endpoints 101a and 101n through the content analysis module 201, retrieve a related pre-selected approach (e.g., overlapping vs. non-overlapping approaches) from the contention resolution logic 207, and synchronize the powering and transmission schedules of the active endpoints 101a and 101n via the powering control module 203. More specifically, the first active endpoint 101a may be designated as a "powering master." In certain embodiments, the powering control module 203 may designate the powering master from among the active endpoints 101a-110n based, at least in part, on predetermined criteria such as transmission power level, remaining battery reserves, and the like. Furthermore, a communication session may be created by the first active endpoint 101a or by the service infrastructure 107 for the connection to be used by the first active endpoint 101a for content transfer from the passive endpoint 103. The responding second active endpoint 101n may then join the session.

In one embodiment, one or more active endpoints 101a-101n may attempt to power or access multiple passive endpoints 103a-103m at the same time. In this case, the contention analysis module 201 may retrieve the setup information for the active endpoints 101 and the passive endpoints 103 involved in the contention from the endpoints setup data 211. The contention analysis module 201 may send the analysis results to the powering control module 203 (if an active endpoint 101 is attempting to power multiple passive endpoints 103) or the data transfer module 205 (if an active endpoint 101 is attempting to read from or write to multiple passive endpoints 103). The contention analysis module may also utilize logical rules from the contention resolution logic 207 regarding any restrictions, priorities, or any other conditions that may be applied to the involved endpoints 101 and/or 103. The powering control module 203 or the data transfer control module 205 may then produce a powering schedule or a data transfer schedule for communication between the endpoints 101 and/or 103 involved in the contention. The provided schedule may then be sent to the preamble generator 209 to generate a preamble over a wireless power transfer channel based on the schedule. The preamble may then be utilized by the respective contention resolution managers 115 and/or 117 of the active endpoints 101 and the passive endpoints 103 to communicate according to the preamble and resolve or avoid potential contention.

In another embodiment, the powering control module 203 may schedule the powering period of a first active endpoint 101a (which acts as powering master) between all active endpoints 101a-101n that requested to communicate with the powered passive endpoint 103a. In this case, powering slots can be merged and scheduled between two or more active endpoints 101a-101n.

It is noted that active endpoints 101a-101n may be able to detect powering periods, negotiate, advertise and synchronize these periods with other active endpoints 101a-101n. Active endpoints 101a-101n may also be able to synchronize by conducting, for instance, a phase search, to discover the powering periods and slot structure of the powering master, so that they can know, for example, the boundaries of the powering periods (e.g., when the periods start or end), whether the powering periods are extended, whether the powering period is being utilized by another active endpoint 101a, etc. It is also noted that a passive endpoint 103a may have a preferred list of powering active endpoints 101a-101n or a history of powering by various active endpoints 101a-101n that have powered and accessed the passive endpoint 103a or are allowed to power and access the passive endpoint 103a. In one embodiment, the powering control module 203 may refer to this list when selecting a powering active endpoint (e.g., from among the active endpoints 101a-101n) for the passive endpoint 103a.

Figure 3A:
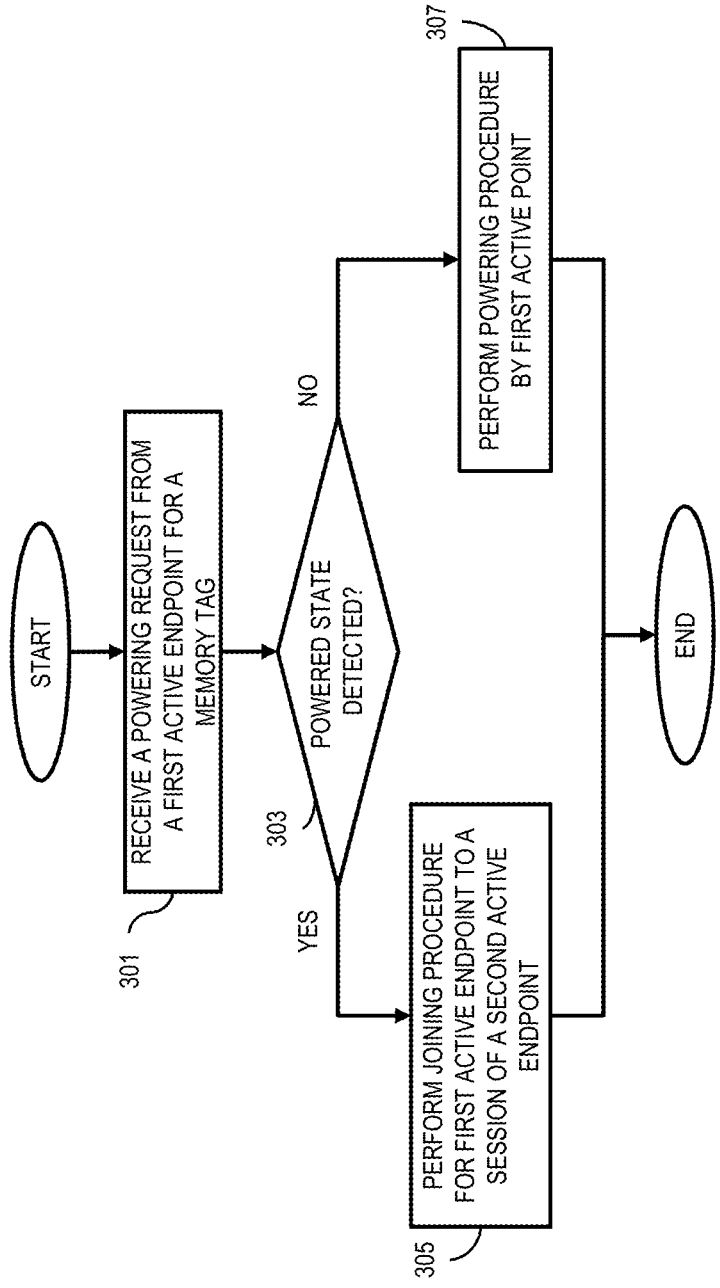
FIGS. 3A-3C are flowcharts of a process for contention resolution of one passive endpoint, according to one embodiment.
Figure 3B:
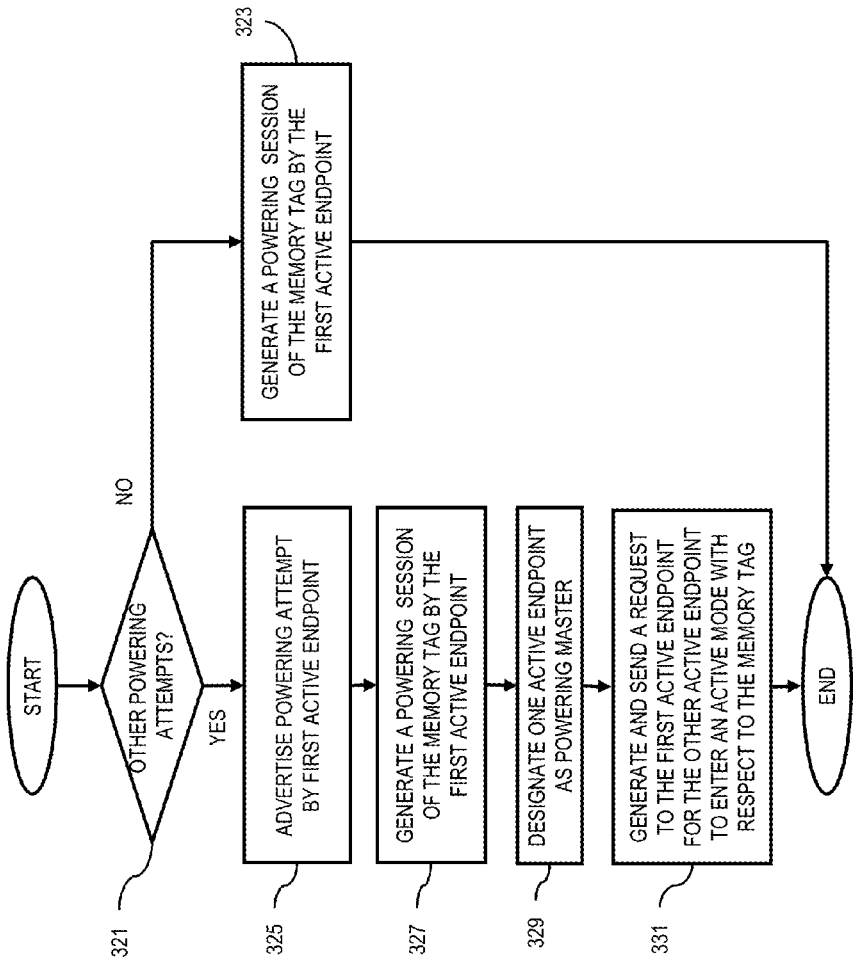
Figure 3C:
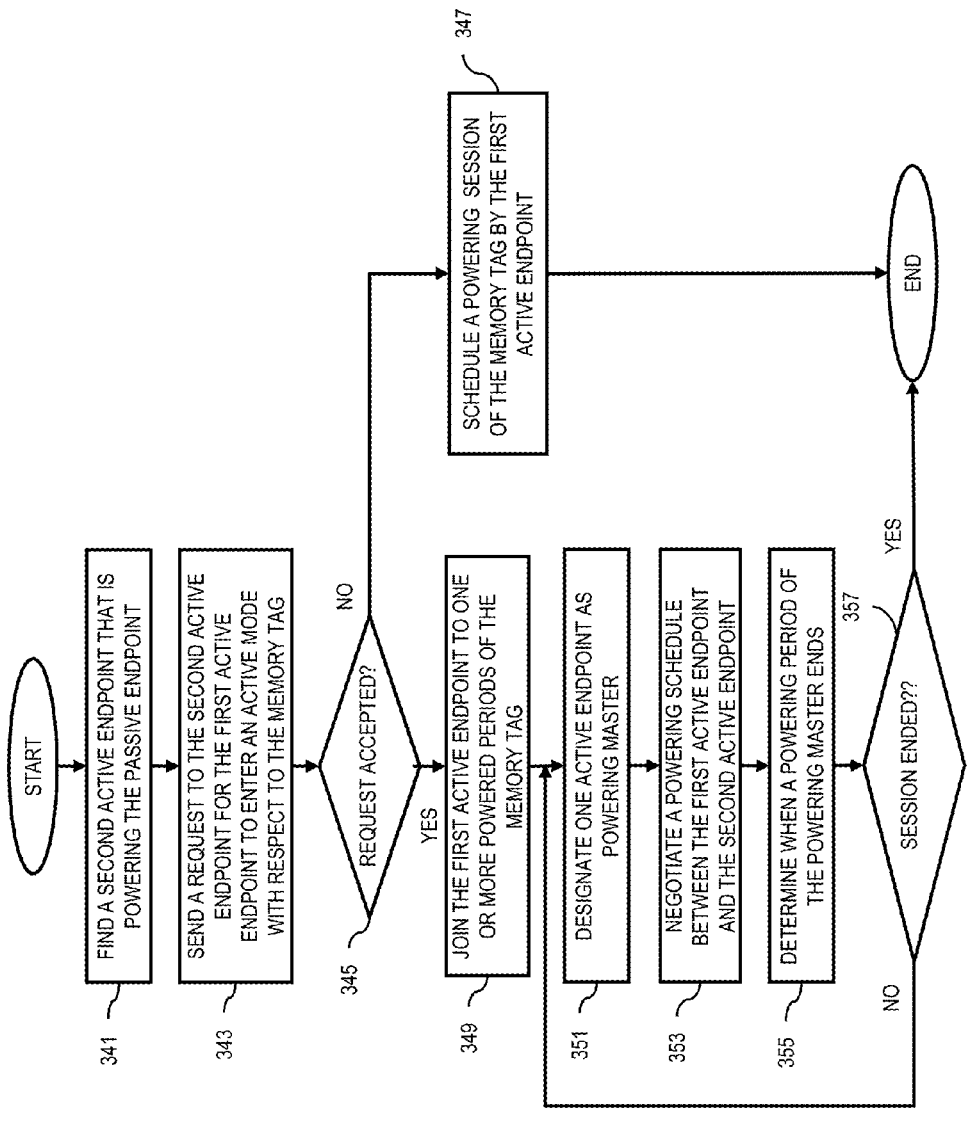

FIGS. 3A-3C are flowcharts of a process for contention resolution of passive endpoints, according to various embodiments. FIG. 3A is a flowchart of a process for detected a powered state of a passive endpoint 103. In one embodiment, the contention resolution platform 119 performs the process 300 and is implemented in, for instance, a chip set including a processor and a memory as shown FIG. 7. It is also contemplated that the contention resolution managers 115 and 117 may perform all or a portion of the process 300 in place of or in addition to the contention resolution platform 119. In step 301, the contention resolution platform 119 receives a request from a first active endpoint 101a to power a passive endpoint 103 (or a RF memory tag 105 of the passive endpoint 103). In step 303, the contention resolution platform 119 checks whether the passive endpoint 103 is already powered by another active endpoint 101n. If the passive endpoint 103 is already powered, per step 305, the contention resolution platform 119 causes the joining procedure 340 of FIG. 3C to be performed so that the requesting active endpoint 101a can join an existing session of the desired passive endpoint 103 powered by another active endpoint 101n. On the other hand, if no powered state for the passive endpoint 103 is detected, the contention resolution platform 119 causes the powering procedure 320 of FIG. 3B to be performed so that the requesting active endpoint 101a can power and read from the desired passive endpoint 103 (step 307).

FIG. 3B is a flowchart for powering process. In one embodiment, the contention resolution platform 119 performs the process 320 and is implemented in, for instance, a chip set including a processor and a memory as shown FIG. 7. It is also contemplated that the contention resolution managers 115 and 117 may perform all or a portion of the process 300 in place of or in addition to the contention resolution platform 119. In step 321, the contention resolution platform 119 checks whether there are other powering attempts for the passive endpoint 103 by other nearby active endpoints 101. If more than one powering attempt exists, in order to prevent a contention, the contention resolution platform 119 advertizes the powering attempt by the first active endpoint 101a per step 325. Alternatively, the contention resolution platform 119 may allow the first active endpoint 101a to advertize its powering attempt by itself. By way of example, the advertizing would inform the other attempting active endpoints 101 about the first active endpoint 101's attempt or intention to power the passive endpoint 103. This may lead to delays in powering attempts by other active endpoints and/or negotiations of a powering and data transmission schedule among the active endpoints 101. Per step 327, the contention resolution platform 119 generates a powering session for the passive endpoint 103 by the first active endpoint 101. At this point, the first active endpoint 101 will be designated as the powering master per step 329. In step 331, the contention resolution platform 119 generates a request to the first active endpoint 101 for other attempting active endpoints 101 to be able to join the session generated for the first active endpoint 101.

In another embodiment, if in step 321, no other powering attempts from other active endpoints 101 are detected, the contention resolution platform 119 generates a powering session for the first active endpoint 101 to power and access the desired passive endpoint 103 (step 323).

FIG. 3C is a flowchart for joining process. In one embodiment, the contention resolution platform 119 performs the process 340 and is implemented in, for instance, a chip set including a processor and a memory as shown FIG. 7. It is also contemplated that the contention resolution managers 115 and 117 may perform all or a portion of the process 300 in place of or in addition to the contention resolution platform 119. In step 341, the contention resolution platform 119 identifies a second active endpoint 101n which is currently powering the passive endpoint 103 desired by a first active endpoint 101a. In one embodiment, the contention resolution platform 119 may identify the second active endpoint 101n to the first active endpoint 101a based, at least in part, on detecting the powered state of the passive endpoint 103. In step 343, the contention resolution platform 119 generates and sends a request to the second active endpoint 101n for the first active endpoint 101a to join the existing session for powering and reading from the passive endpoint 103. In one embodiment, the first active endpoint 101a may inform the contention resolution platform 119 of its intention to join the session. Furthermore, the contention resolution platform 119 may enable the first active endpoint 101a to locally generate the request of step 343 and send the request to the second active endpoint 101n directly. Additionally, the contention resolution platform 119 may automatically generate and send the request of step 343 as a default process without having to wait for the first active endpoint 101a's request.

In step 345, the contention resolution platform 119 receives a response from the second active endpoint 101n regarding the joining request. If the joining request has been accepted by the second active endpoint 101n, the first active endpoint 101a can join the existing powered session of the passive endpoint 103 per step 349. After the first active endpoint 101a joins the session, in step 351, the contention resolution platform 119 designates one of the active endpoints 101 as the powering master for the session (e.g., the active endpoint 101 that is responsible for transmitting the WPT signal to provide power to the passive endpoint 103). As noted, the designation of the powering master can be based on one or more criteria applied to the active endpoints 101a and 101n. In the example of FIG. 3C, the second active endpoint 101n is the powering master, which means that if the second active endpoint 101n ends the session (e.g., stops powering the passive endpoint 103), the first active endpoint 101a needs to join an upcoming session by another active endpoint 101 or power the passive endpoint 103 by itself in order to be able to continue communicating with the passive endpoint 103 or, for example as mentioned earlier, request for extension of the current powering period. Per step 353, the contention resolution platform 119 negotiates with the first and the second active endpoints 101a and 101n to generate a powering and/or transmission schedule for the passive endpoint 103 with respect to the first and the second active endpoints 101a and 101n. In one embodiment, the schedule can be stored in the database 211 of endpoint setup data for further use.

In some embodiments, more than two active endpoints 101 may share a session for powering and/or accessing a passive endpoint 103. In this case, as described previously with respect to two active endpoints 101, one active endpoint 101a would be designated as the powering master and the other active endpoints 101 would join the session one by one. The order in which the other active endpoints 101 join the session may be determined based on the order in which they requested to join the session; predefined priorities determined by the contention resolution platform 119; or a combination thereof.

In step 355, the contention resolution platform 119 determines the end of the powering of the passive endpoint 103 by the current powering master. If the powering period ends and other joining active endpoints 101 have either already left the session or are attempting to end their connection, meaning that no active endpoint 101 remains in the session, then step 357 would lead to the end of process. Otherwise, if there are other joining active endpoints 101 which are still communicating with the passive endpoint 103, the contention resolution platform 119 would repeat the process from step 351 by designating one of the remaining active endpoints 101 as a new powering master.

In another embodiment, if in either step 345, the second active endpoint 101n does not accept the joining request from the first active endpoint, per step 347, the contention resolution platform 119 schedules a powering session for the passive endpoint 103 by the first active endpoint 101a to avoid contention. By way of example, the second active endpoint 101n may reject the joining request from the first active endpoint 101n for various reasons such as security, available processing power, priority level, battery power level etc.

Once a session is ended, the contention resolution platform 119 may automatically activate the scheduled powering sessions in the order of the negotiated scheduling, based on, for instance, the relative priority of the active endpoints 101.

Figure 4A:
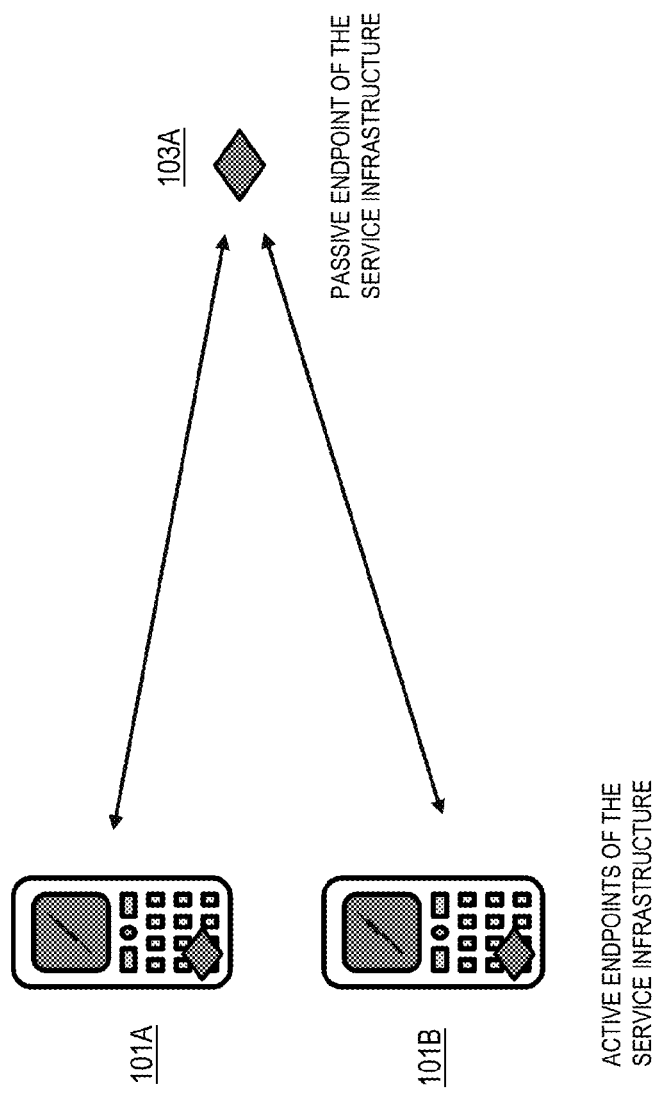
FIGS. 4A-4B are exemplary diagrams of contention resolution, according to one embodiment.
Figure 4B:
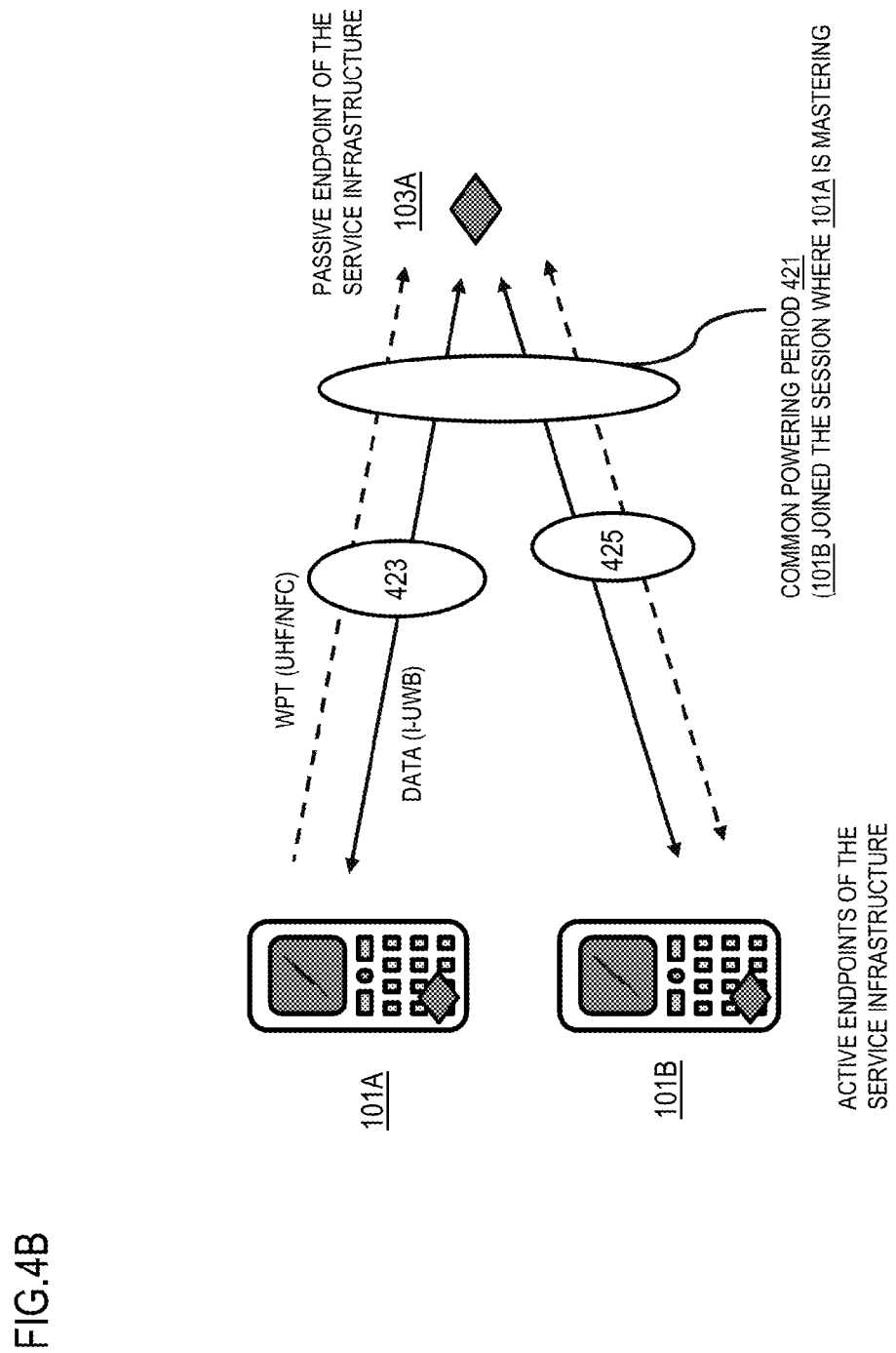

FIGS. 4A-4B are exemplary diagrams of contention resolution, according to various embodiments. As seen in FIG. 4A, the active endpoints 101a and 101b of the service infrastructure 107 may retrieve or read information from the passive endpoint 103a in a common session (e.g., multicast). Alternatively, the active endpoints 101a and 101b may attempt to simultaneously connect to the same passive endpoint 103a of the service infrastructure 107 via unicast transmissions. In this example, both of the active endpoints 101a and 101b join the same session in the same passive endpoint (103a) of the service infrastructure 107. As described previously, the approach where the multiple active endpoints 101a and 101b join the same session in the passive endpoint 103a may be used in situations where contention resolution is needed or the contention is to be avoided. In this example, the access scheme to the content of the passive endpoint 103a by the active endpoints 101a and 101b may overlap.

In some embodiments one of the active endpoints 101a or 101b may reserve sessions or transmission slots of the passive endpoint 103a so that no other active endpoint would be able to access the passive endpoint 103a at during the reserved period. Furthermore, the active endpoint 101a or 101b reserving the passive endpoint 103a may prevent any other active endpoint from joining the reserved session it initiates with the passive endpoint.

In one embodiment, the active endpoints 101a and 101b may read or transmit information to or from the passive endpoint 103a as a multicast. In one embodiment, the multicasting may be performed by using a multiplexor. In this case, the active endpoints 101a and 101b prepare or read the multiplexed information and propagate the multiplexed message to or from the passive endpoint 103a. In certain embodiments, the multiplex messages may be associated with a session ID that is visible to both of the active endpoints 101a and 101b and the passive endpoint 103a. The session ID can be used, for instance, to align the multiplexed information according to the available transmission slot information.

In another embodiment, the passive endpoint 103a may use methods such as a "forced backoff algorithm" in order to decrease the multicasting rate if necessary. The passive endpoint 103a then realigns the multiplexed commands according to available transmission slots following application of the algorithm.

FIG. 4B depicts merging on two competing active endpoints into one common powering period 421. As shown, an active endpoint 101a that is a powering initiator and another active endpoint 101b may merge into a powering period 421 initiated by active endpoint 101a. In one embodiment, the merging process may consist of "join" and "leave" processes. More specifically, the passive endpoint 103a may inform the active endpoint 101b about the powering statistics of ongoing connections 423 and 425 with the active endpoint 101a. The information may include, for instance, the owner of the powering period 421 and how other active endpoints can join the powering period session 421 (e.g., by making a multicast transmission to a group of active endpoints).

In one embodiment, the contention resolution platform 119 determines the active endpoint 101a that is powering the passive endpoint 103a. If a contention among active endpoints 101a and 101b is detected, the contention resolution platform 119 selects one of the active endpoints 101a or 101b as the powering endpoint. The selection is performed based on certain selection criteria such as highest power level of each contending active endpoint 101a or 101b. In this example, the active endpoint 101a is selected as the powering endpoint or powering master.

The selected active endpoint 101a may start powering the passive endpoint 103a and then broadcast a message to other active endpoint 101b that it has now become the session owner or the powering master. For example, the session owner is the active endpoint 101a that has the highest privilege of accessing the content of the passive endpoint 103a. The other active endpoint 101b in the same session may have the capability to take-over the session ownership position. The contention resolution platform 119 may send a message to the current session owner to inform the session owner if the other active endpoint 101b (another potential session owner) attempts to read or write to the same passive endpoint 103a.

On the other hand, any of the active endpoints 101*a* or 101*b* may request information about the current session 421 or to join the current session 421. An active endpoint 101*a* or 101*b* may also request information on when the current powering period 421 will end, or to schedule its own powering period after the current period 421 ends.

In one embodiment, multiple passive endpoints (not shown) may exist. In this embodiment, one or more active endpoints 101*a* and/or 101*b* may attempt to communicate with one or more passive endpoints 103*a*. An active endpoint 101*a* may request its own independent read/write session (e.g., sessions 423 and 425). The active endpoint 101*a* may also request to communicate with other active and passive endpoints (e.g., first with initial target passive end point and then to the rest of the passive endpoints and/or other active endpoints 101*b*). Furthermore, an active endpoint 101*a* may respond to the join request from other active endpoints (e.g., active endpoint 101*b*) to join its initiated session 421, leave a session 421 that it previously joined, or terminate a session 421 that it previously initiated.

Figure 5A:
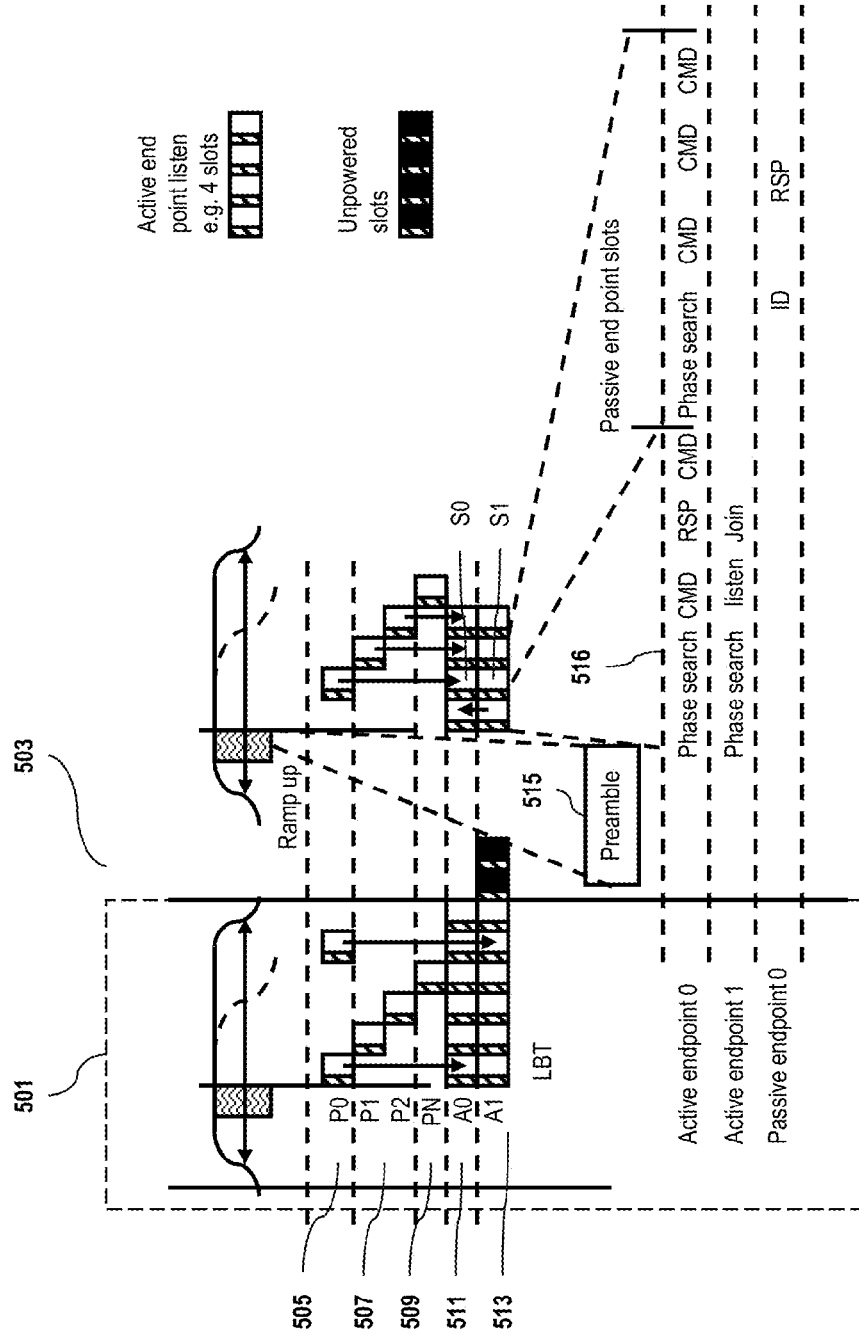
FIGS. 5A-5C are exemplary diagrams of contention resolution of powering and data transfer for multiple passive endpoints, according to one embodiment.
Figure 5B:
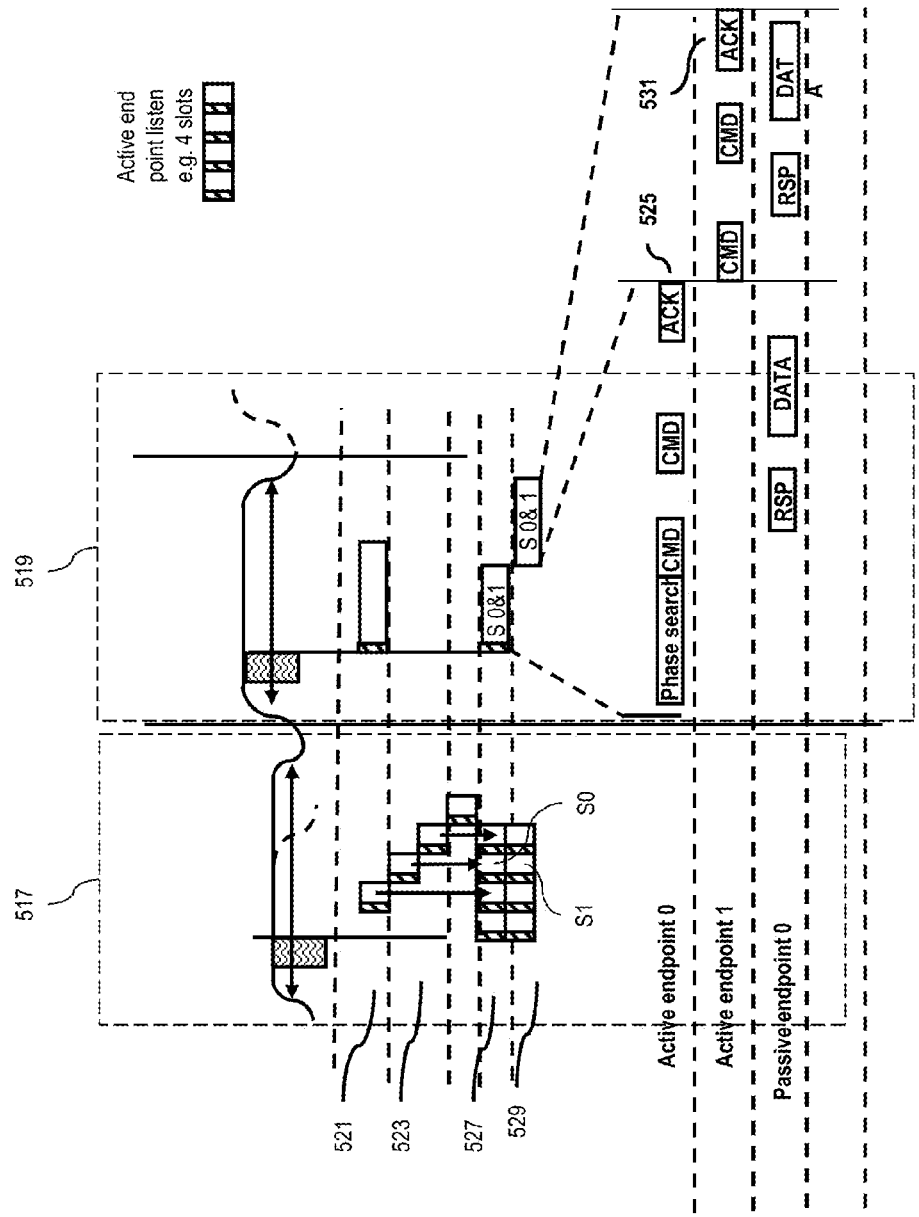
Figure 5C:
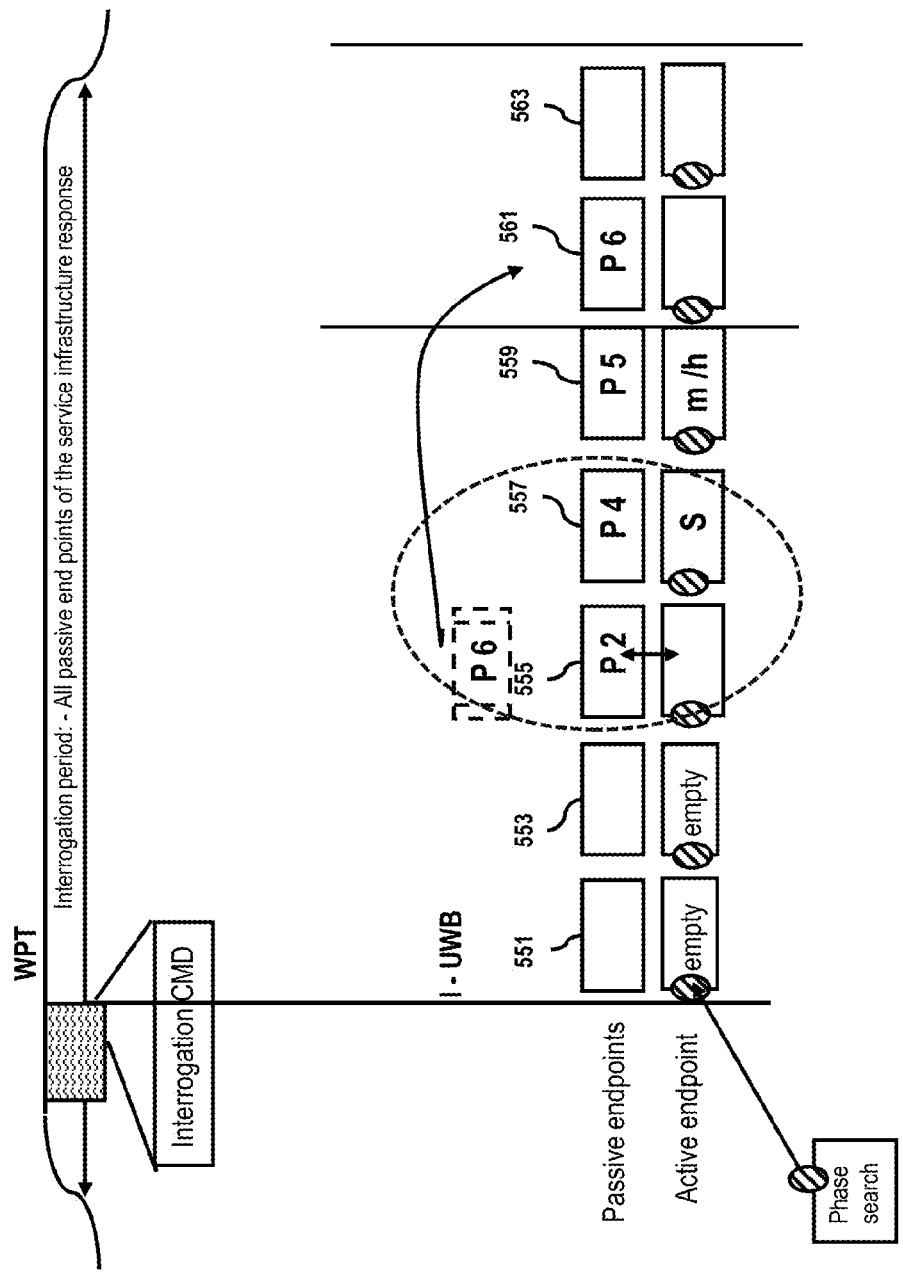

FIGS. 5A-5C are exemplary diagrams of contention resolution of powering and data transfer for multiple passive endpoints, according to various embodiments. In FIG. 5A, two different powering periods 501 and 503 are depicted. The process shown within block 501 represents a non-overlapping embodiment where active endpoints do not share powering of passive endpoints. In this embodiment, an active endpoint 1 which is attempting to power one or more passive endpoints that are currently powered by another active endpoint 0 would wait and listen before talk (LBT) until the other active endpoint releases the passive endpoint. As seen in block 501 of FIG. 5A, in the first time slot of the interrogation period (powering period via the WPT signal of active endpoint 0) the passive endpoint 0 (on row 505) is assigned to the active endpoint 0 (on row 511) while the active endpoint 1 of row 513 is listening. Similarly, in the second and third time slot of the powering period as seen in the row 507 passive endpoints 1 and 2 are again assigned to the active endpoint 0, until row 509 where the passive endpoint N is assigned to active endpoint 0. As seen in row 513, during the time slots 0 to N the active endpoint 1, while reserving the passive endpoints 0 to N, is waiting and listening until the fifth time slot when the passive endpoint 0 is released by the active endpoint 0 and becomes available. This is when the active endpoint 1 takes control and powers the passive endpoint 0.

In another embodiment, the process shown within block 503 represents an overlapping embodiment where active endpoints share powering of passive endpoints by joining a powering session initiated by another active endpoint. In this embodiment, an active endpoint 1 which is attempting to power one or more passive endpoints that are currently powered by another active endpoint 0 would request to join the session initiated by active endpoint 0 in order to utilize the same passive endpoint. As seen in block 503 of FIG. 5A, before the first time slot of block 503, the preamble 515 which is generated based on a scheduling scheme by the preamble generator 209 of FIG. 2 is received. In the first time slot of the interrogation period (powering period via the WPT signal of active endpoint 0), the two active endpoints 0 and 1 are synchronized with each other by the contention resolution platform 119 via the content of the preamble signal 515. In the second time slot of the interrogation period, the passive endpoint 0 (on row 505) is assigned to the active endpoint 0 (on row 511) while the active endpoint 1 of row 513 joins the powering session. Similarly, in the next time slots of the powering period as seen in the row 507, the passive endpoints 1 and 2 are again assigned to the joint sessions 0 and 1 for active endpoints 0 and 1, enabling the active endpoint 1 to utilize multiple passive endpoints powered by the active endpoint 0 and simultaneously with the active endpoint 0. Furthermore, the signaling slot 516 enables the active endpoints to share information among themselves either at the beginning or at the last slot.

In FIG. 5B a powering period 517 and a data transfer period 519 are depicted. The process shown within block 517 represents an overlapping embodiment similar to the one in block 503 of FIG. 5A where active endpoints share powering of passive endpoints by joining a powering session initiated by another active endpoint.

The process shown within block 519 represents an embodiment where active endpoints which are sharing powering of passive endpoints in a common session. In this embodiment, an active endpoint 0 selects passive endpoint 0 per row 521 and starts utilizing the passive endpoint 0 as seen in row 527 (shown as S 0&1 for a joint session for active endpoints 0 and 1). When the active endpoint 0 completes its use of the passive endpoint 0, the contention resolution platform 119 issues an acknowledgement (ACK 525) to other active endpoints of the session (e.g., active endpoint 1) that the passive endpoint 0 is available per row 523. As per row 529, as soon as the active endpoint 0 releases the passive endpoint 0, the active endpoint 1 selects the passive endpoint 0 and starts using it. Similarly, the contention resolution platform 119 can issue acknowledgment 531 informing other active endpoints in the session about the release of the passive endpoint 0.

FIG. 5C depicts the process for passive endpoint selection within a powering period. As shown, the example of FIG. 5C depicts seven slots 551-563. It is assumed that all the passive endpoints have responded to a scan of a powering attempt. In this example, if a fall back status occurs, for example if a collision between passive endpoints P2 and P6 for slot 555 occurs, passive endpoint P6 may fall back to the next available slot 561. However, if no fall back occurs, for example passive endpoints P2 and P6 are not detected by the active endpoint, P4 would be the first detected passive endpoint and P2 and P6 may be detected in the next interrogation period. Empty slots 551, 553, 561 and 563 are slots where no passive endpoints have been detected. A passive endpoint may have a status as selected (s), mute (m) or hibernated (h).

In one embodiment where no collision has occurred, the active endpoint may detect and select the responding passive endpoints. The active endpoint may verify whether the responding endpoint is a passive endpoint. A no collision example is when passive endpoints P2, P4 and P5 respond to the scan (and no P6). In this case one of the passive endpoints P2, P4 or P6 is selected by the active endpoint. In one embodiment, the Media Access Control (MAC) layer of the active endpoint may contain information on which available passive endpoint is to be selected first.

The processes described herein for providing contention resolution of passive endpoints may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
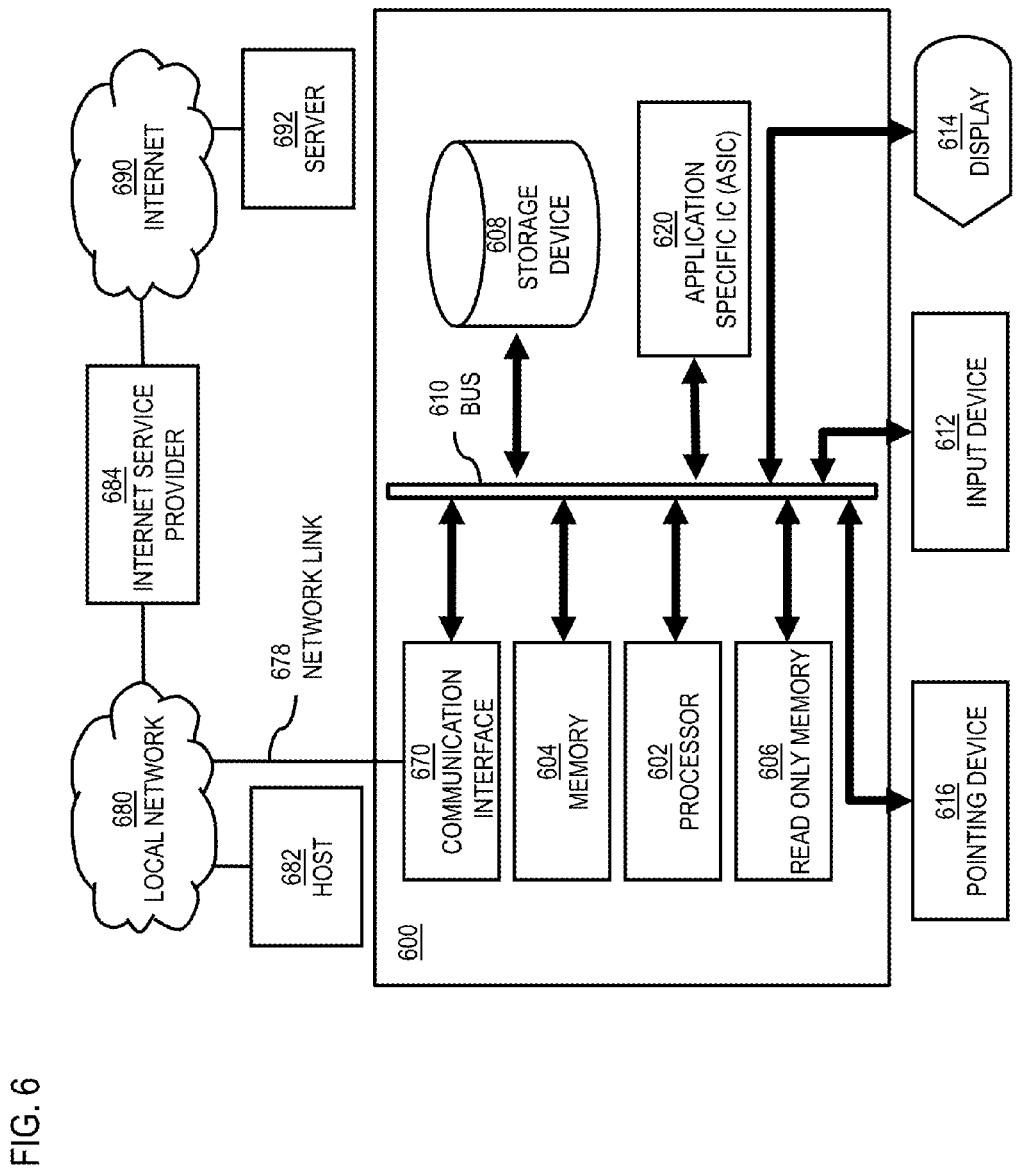
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide contention resolution of passive endpoints as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of contention resolution of passive endpoints.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to contention resolution of passive endpoints. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for contention resolution of passive endpoints. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for contention resolution of passive endpoints, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 111 for providing contention resolution of passive endpoints to the active endpoints 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
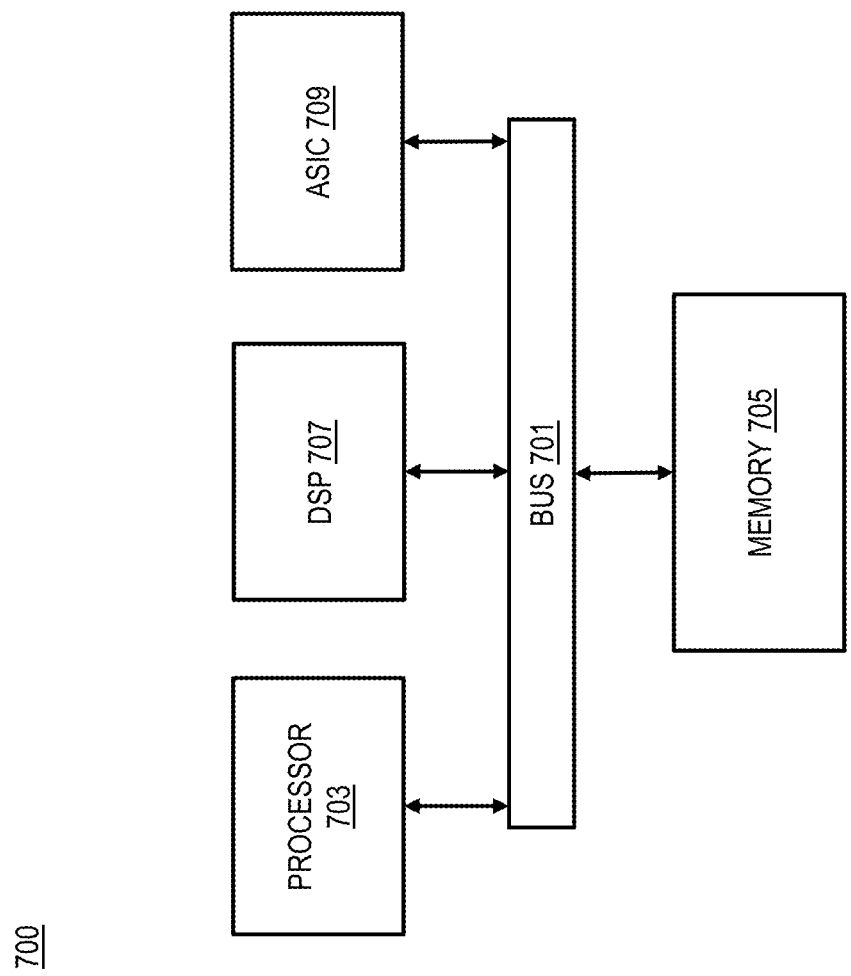
FIG. 7 is a diagram of a chip set that can be used to implement an embodiment of the invention.

FIG. 7 illustrates a chip set or chip 700 upon which an embodiment of the invention may be implemented. Chip set 700 is programmed to provide contention resolution of passive endpoints as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of contention resolution of passive endpoints.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide contention resolution of passive endpoints. The memory 705 also stores the data associated with or generated by the execution of the inventive steps.

Figure 8:
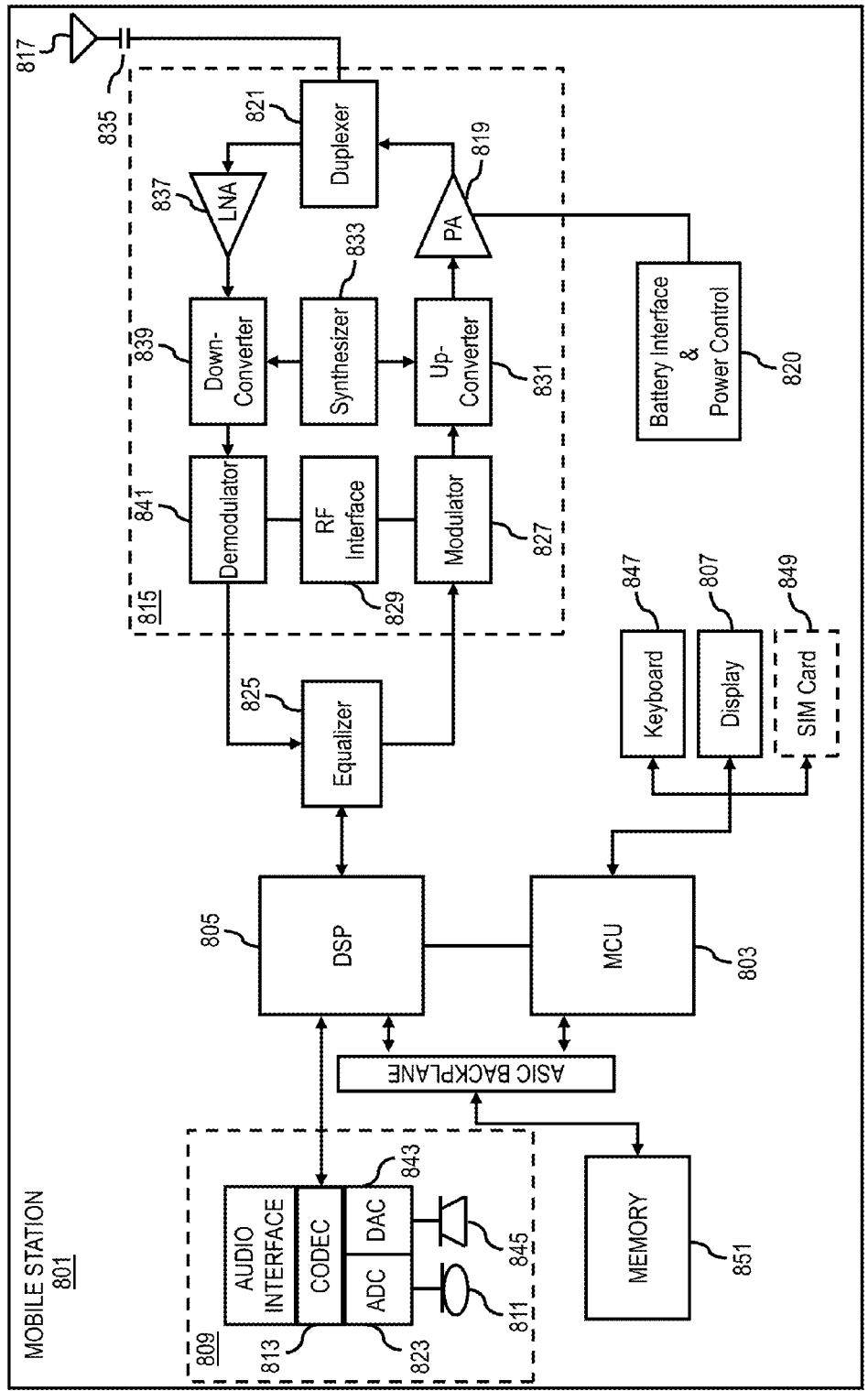
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of contention resolution of passive endpoints. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of contention resolution of passive endpoints. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide contention resolution of passive endpoints. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
causing, at least in part, scanning, by a first active endpoint having a memory tag reader, of a data channel of a memory tag of a passive endpoint that communicates memory content to one or more active endpoints, to detect a powered state of the memory tag;
identifying by the first active endpoint a second active endpoint having a memory tag reader based, at least in part, on detection of the powered state;
generating by the first active endpoint a request to the second active endpoint for the first active endpoint to enter an active mode with respect to the memory tag;
causing, at least in part, transmission of the request by the first active endpoint to the second active endpoint;
receiving by the first active endpoint a response from the second active endpoint to the request; and
joining the first active endpoint to one or more powered periods of the memory tag established with the second active endpoint based, at least in part, on the response, for communication with the memory tag to access the memory content.

2. A method of claim 1, further comprising:
if a powered state is not detected, causing, at least in part, powering of the memory tag via a wireless power transfer channel of the first active endpoint.

3. A method of claim 2, further comprising:
causing, at least in part, transmission of a message indicating an intent to power the memory tag; and
receiving one or more responses to the message,
wherein the powering of the memory tag is based, at least in part, on the responses.

4. A method of claim 1, further comprising:
negotiating a powering schedule between the first active endpoint and the second active endpoint,
wherein the powering schedule directs broadcasts over a wireless power transfer channel, the data channel, or a combination thereof corresponding respectively to the first active endpoint and the second active endpoint so that the broadcasts do not overlap.

5. A method of claim 4, wherein the powering schedule provides for substantially equal times for broadcasting over the wireless power transfer channels, the data channels, or the combination thereof of the first active endpoint and the second active endpoint.

6. A method of claim 1, further comprising:
designating either the first active endpoint or the second active endpoint as a powering master;
wherein the powering master broadcasts over a wireless power transfer channel to initiate the powered state and shares its power with another active endpoint.

7. A method of claim 6, further comprising:
specifying one or more criteria for the designation of the powering master,
wherein the criteria includes at least a broadcast power level.

8. A method of claim 6, further comprising:
determining when a powering period of the powering master ends;
scheduling the designation of either the first active endpoint or the second active endpoint that was not previously the powering master as a new powering master based, at least in part, on the determination.

9. A method of claim 1, wherein the memory tag is part of a chain topology of a plurality of memory tags, the method further comprising:

generating a preamble of a broadcast over a wireless power transfer channel, the data channel, or a combination thereof;

incorporating an identification of either the first active endpoint or the second active endpoint and one or more of the plurality of memory tags in the preamble, wherein the preamble notifies that the identified first active endpoint or the second active endpoint is powering the one or more memory tags.

10. An apparatus comprising:

at least one processor; and at least one memory including computer program code, the at least one memory and the computer program code configured to, with the at least one processor, cause the apparatus to perform at least the following, cause, at least in part, scanning, by a first active endpoint having a memory tag reader, of a data channel of a memory tag of a passive endpoint that delivers memory content to one or more active endpoints, to detect a powered state of the memory tag;

identify by the first active endpoint a second active endpoint having a memory tag reader based, at least in part, on detection of the powered state;

generate by the first active endpoint a request to the second active endpoint for the first active endpoint to enter an active mode with respect to the memory tag;

cause, at least in part, transmission of the request by the first active endpoint to the second active endpoint;

receive by the first active endpoint a response from the second active endpoint to the request; and join the first active endpoint to one or more powered periods of the memory tag established with the second active endpoint based, at least in part, on the response, for communication with the memory tag to access the memory content.

11. An apparatus of claim 10, wherein the apparatus is further caused to:

if a powered state is not detected, cause, at least in part, powering of the memory tag via a wireless power transfer channel of the first active endpoint.

12. An apparatus of claim 11, wherein the apparatus is further caused to:

cause, at least in part, transmission of a message indicating an intent to power the memory tag; and receive one or more responses to the message, wherein the powering of the memory tag is based, at least in part, on the responses.

13. An apparatus of claim 10, wherein the apparatus is further caused to:

negotiate a powering schedule between the first active endpoint and the second active endpoint, wherein the powering schedule directs broadcasts over a wireless power transfer channel, the data channel, or a combination thereof corresponding respectively to the first active endpoint and the second active endpoint so that the broadcasts do not overlap.

14. An apparatus of claim 13, wherein the powering schedule provides for substantially equal times for broadcasting over the wireless power transfer channels, the data channels, or the combination thereof of the first active endpoint and the second active endpoint.

15. An apparatus of claim 10, wherein the apparatus is further caused to:

designate either the first active endpoint or the second active endpoint as a powering master;

wherein the powering master broadcasts over a wireless power transfer channel to initiate the powered state and shares its power with another active endpoint.

16. An apparatus of claim 15, wherein the apparatus is further caused to:

determine when a powering period of the powering master ends;

schedule the designation of either the first active endpoint or the second active endpoint that was not previously the powering master as a new powering master based, at least in part, on the determination.

17. An apparatus of claim 10, wherein the memory tag is part of a chain topology of a plurality of memory tags, and wherein the apparatus is further caused to:

generate a preamble of a broadcast over a wireless power transfer channel, the data channel, or a combination thereof;

incorporate an identification of either the first active endpoint or the second active endpoint and one or more of the plurality of memory tags in the preamble, wherein the preamble notifies that the identified first active endpoint or the second active endpoint is powering the one or more memory tags.

18. An apparatus of claim 10, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

19. A computer-readable storage medium carrying one or more sequences of one or more instructions which, when executed by one or more processors, cause an apparatus to at least perform the following steps:

causing, at least in part, scanning, by a first active endpoint having a memory tag reader, of a data channel of a memory tag of a passive endpoint that delivers memory content to one or more active endpoints, to detect a powered state of the memory tag;

identifying by the first active endpoint a second active endpoint having a memory tag reader based, at least in part, on detection of the powered state;

generating by the first active endpoint a request to the second active endpoint for the first active endpoint to enter an active mode with respect to the memory tag;

causing, at least in part, transmission of the request by the first active endpoint to the second active endpoint;

receiving by the first active endpoint a response from the second active endpoint to the request; and joining the first active endpoint to one or more powered periods of the memory tag established with the second active endpoint based, at least in part, on the response, for communication with the memory tag to access the memory content.

20. A computer-readable storage medium of claim 19, wherein the apparatus is caused to further perform:

negotiating a powering schedule between the first active endpoint and the second active endpoint, wherein the powering schedule directs broadcasts over a wireless power transfer channel, the data channel, or a combination thereof corresponding respectively to the first active endpoint and the second active endpoint so that the broadcasts do not overlap.

* * * * *